(12) United States Patent
Belz et al.

(10) Patent No.: US 7,618,187 B2
(45) Date of Patent: Nov. 17, 2009

(54) ELECTROMECHANICAL TEMPERATURE DETECTION DEVICE FOR A COOKING APPLIANCE AND METHOD FOR THE MANUFACTURE OF AN ELECTROMECHANICAL TEMPERATURE DETECTION DEVICE

(75) Inventors: Bernhard Belz, Waghäusel (DE); Willi Reichert, Kürnbach (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 0 days.

(21) Appl. No.: 11/962,527

(22) Filed: Dec. 21, 2007

(65) Prior Publication Data

US 2008/0130709 A1    Jun. 5, 2008

Related U.S. Application Data

(63) Continuation of application No. PCT/EP2006/005894, filed on Jun. 20, 2006.

(30) Foreign Application Priority Data

Jun. 24, 2005    (DE)    ........................ 10 2005 031 069

(51) Int. Cl.
    *G01K 5/00*    (2006.01)
(52) U.S. Cl. ...................... 374/187; 374/141; 374/208; 374/195; 374/196
(58) Field of Classification Search ................ 374/141, 374/208, 187, 195, 196
    See application file for complete search history.

(56) References Cited

U.S. PATENT DOCUMENTS 2,876,725 A * 3/1959 Buck et al. ...................... 413/1
3,710,076 A    1/1973 Frazier
4,135,081 A * 1/1979 Fischer ................... 219/448.19
4,243,874 A    1/1981 Fischer
4,414,465 A    11/1983 Newton et al.

(Continued)

FOREIGN PATENT DOCUMENTS

DE    901457    11/1951

(Continued)

OTHER PUBLICATIONS

International Search Report from PCT/EP2006/005894 dated Oct. 12, 2006.

(Continued)

*Primary Examiner*—Gail Verbitsky
*Assistant Examiner*—Mirellys Jagan
(74) *Attorney, Agent, or Firm*—Alston & Bird LLP (57) ABSTRACT

An electromechanical temperature detection device for a cooking appliance comprises a first rod-shaped sensor part and a second tubular-shaped sensor part. The first sensor part and the second sensor part are made from materials having different thermal expansion co-efficients. The first sensor part is positioned inside the second sensor part. An end area of the first sensor part is connected to the second sensor part in the end area of the second sensor part and the opposite end area of the first sensor part is connected to a switching device. The second sensor part consists of a sheet metal stamped part which is embodied along a longitudinal axis such that it surrounds a longitudinal area in a tubular like manner with a first sensor part positioned inside the tubular part.

9 Claims, 7 Drawing Sheets

U.S. PATENT DOCUMENTS

| | | | |
|---|---|---|---|
| 5,310,993 A | 5/1994 | McWilliams et al. | |
| 5,420,398 A | 5/1995 | Petri et al. | |
| 5,694,107 A | 12/1997 | Moriwake et al. | |
| 6,216,509 B1 * | 4/2001 | Lotspaih et al. | 72/61 |
| 6,272,735 B1 | 8/2001 | Moriwake et al. | |
| 6,483,084 B2 | 11/2002 | Petri et al. | |

FOREIGN PATENT DOCUMENTS

| | | |
|---|---|---|
| DE | 78 13 597 | 8/1978 |
| DE | 3333645 | 4/1985 |
| GB | 2339475 | 1/2000 |

OTHER PUBLICATIONS

German Search Report from German Application No. 10 2005 031 069.9.

* cited by examiner

ELECTROMECHANICAL TEMPERATURE DETECTION DEVICE FOR A COOKING APPLIANCE AND METHOD FOR THE MANUFACTURE OF AN ELECTROMECHANICAL TEMPERATURE DETECTION DEVICE

CROSS REFERENCE TO RELATED APPLICATIONS

This application is a continuation of PCT/EP2006/005894, filed Jun. 20, 2006, which in turn claims priority to DE 10 2005 031 069.9, filed on Jun. 24, 2005, the contents of both of which are incorporated by reference.

FIELD OF THE INVENTION

The invention relates to an electromechanical temperature detection device for a cooking appliance.

BACKGROUND OF THE INVENTION

Temperature detection devices can have at least one first, elongated sensor part and at least one second, channel-like and/or tubular sensor part. The first sensor part within the second sensor part is at least partly parallel to a longitudinal axis of said second sensor part. The first sensor part and the second sensor part are made from materials with different thermal expansion coefficients and an end area of the first sensor part is connected in an end area of the second sensor part to the latter. The opposite end area of the first sensor part or the second sensor part is connected to a switching device. As a result of a different expansion behaviour a relative movement occurs by means of which the switching device or a contact can be operated.

Such temperature detection devices are for example known from U.S. Pat. No. 4,633,238 A1, which describes an inner rod located within an outer tube, which is fixed to a base. The inner rod and outer tube are made from materials with different expansion coefficients, namely a steatite rod and a metal tube. The outer tube and one end of the inner rod are interconnected at the remote end of the outer tube. The opposite end area of the inner rod is in engagement with an electrical switching device in the inner region of the base.

For the production of the outer tube said tubes must be cut from a bar-type tubular raw material, the cutting sites must be deburred and the cut areas checked for roundness. In the case of a roll or coil-type tubular raw material it is also necessary to straighten the cut off outer tube blanks.

The above mentioned production techniques are complicated, and thus there is a need to provide an electromechanical temperature detection device that can easily be manufactured.

BRIEF DESCRIPTION OF THE DRAWINGS

Embodiments of the invention are described in greater detail hereinafter relative to the attached diagrammatic drawings, wherein show.

DETAILED DESCRIPTION

This problem is solved in one embodiment by an electromechanical temperature detection device having the features of claim 1 and by a method for the manufacture of an electromechanical temperature detection device having the features of claim 10. Advantageous and preferred embodiments of the invention form the subject matter of the further claims and are explained in greater detail hereinafter. By express reference the wording of the claims is made into part of the content of the description. Some of the features and characteristics enumerated hereinafter relate both the electromechanical temperature detection device and to the method for the manufacture of the electromechanical temperature detection device. They are in part only described once, but independently of one another apply both to the electromechanical temperature detection device and its manufacturing method.

According to one embodiment of the invention, the second sensor part comprises a stamped part of a flat material. The stamped part is at least partly so constructed along its longitudinal axis that it at least partly surrounds an area. The use of flat material makes it possible to easily and quickly produce large quantities of blanks for the second sensor part, which can be further processed without any significant blank prior treatments to give the second sensor part. The use of flat material also simplifies the storage of the raw material. The flat material can be plate-like and/or strip-like. Besides stamping, the stamped part can also be cut or shaped using other methods.

In order to at least partly surround an area, so that storage or guidance is possible, the stamped part can be constructed in different ways. Thus, the stamped part can have a U-shaped construction and in the surrounded or enclosed area the first sensor part is placed parallel to the legs of the U-shape. The second sensor part can also comprise several stamped strips arranged parallel to one another surrounding a median longitudinal axis of the second sensor part and interconnected at their end areas. However, the stamped part can also be bent to form a tube and/or a tubular section such as for example a channel and it is only of minor significance whether the tube is circular or angular. However, it is pointed out that the linear extension of the second stamped part is more uniform and distortion-free in correlation with the more volume area it spatially encloses and the fewer outer edges on the tube.

In another embodiment of the invention, the second sensor part is at least partly concentrically bent around at least one median longitudinal axis. The tubular or channel-like construction of the sensor part makes it possible to bring said sensor part into already existing receptacles for a temperature detection device, such as are already known from the prior art and in which the second sensor part is cylinder tube-like. Advantageously, the second sensor part is at least partly cylindrical. With a cylinder shape, the thermal expansion is at its most uniform and there is a minimum distortion in the component.

In another embodiment of the invention, the second sensor part is at least partly constructed with an elliptical and/or lenticular cross-section. The second sensor part can also at least partly have an at least partial prismatic cross-section, particularly that of a polygonal prism. The non-circular or prismatic construction of the second sensor part, for example, permits a twist-proof fitting of the second sensor part to a base of a housing in which is located, for example, in the switching device. In an advantageous development of the invention, the prismatic cross-section is three or four sided.

In another embodiment of the invention, the second sensor part is in an at least partly rounded manner, bent around at least one median longitudinal axis and has at least partly a prismatic construction, particularly in the form of a polygonal prism. Preferably, one end area of the second sensor part is prismatic and the facing end area of the second sensor part is circular. Thus, the second sensor part can be, on the one hand, placed in twist-proof manner on the housing and, on the other hand, in holes or already existing recesses on or in the cooking appliance.

In another embodiment of the invention, on one of the longitudinal edges of the stamped part is provided at least one portion projecting from the substantially straight longitudinal edge and on a longitudinal edge of the stamped part facing said first longitudinal edge there is at least one recess corresponding to the projection portion. The projecting portions can have an angular, circular or, for example, mushroom shape. There can also be a plurality of projecting portions, which can also have a wavy construction. In a further development of the invention, on each of the longitudinal edges there can be both at least one projecting portion and also at least one recess corresponding to the projecting portion. Following the bending of the stamped part, advantageously the at least one projecting portion is in engagement with the recess corresponding to the projecting portion. In a particularly advantageous manner, one portion makes a positive engagement with the corresponding recess. The projecting portions and the recesses corresponding to said projecting portions make it possible to maintain the bent shape of the bent stamped part through the mutually engaging and positive engagement-forming portions and recesses. A further securing of the bent shape can be provided, but is not absolutely necessary. The term positive engagement is here understood to mean that at least two objects to be connected engage in one another by means of geometrically corresponding or mating shapes. The positive engagement is maintained if a force transfer between the object to be connected does not occur and/or is interrupted.

In a further embodiment of the invention, the contacting longitudinal edges of the second sensor part are interconnected by integral joining, preferably being welded together. However, the longitudinal edges can also be bonded, soldered or joined by any other integral, temperature-resistant joint. This integral joining of the longitudinal edges constitutes an alternative to the above-described construction of the sensor part with projecting portions and corresponding recesses. However, it is also possible to jointly use integral joining and positive engagement and the integral joining can secure the positive engagement. A further alternative is constituted by fitted on rings, clips, etc.

In another embodiment of the invention, the flat material of the second guide part is a metal sheet, advantageously a steel sheet. A steel sheet is particularly advantageous, because the processing modes and characteristics of the material are well known. Any alloy type suitable for this purpose can be used for the second sensor part. In addition to steel, it is possible to use any other material which can be processed to a stampable sheet.

The stamping process can be used solely for separating the stamped part from the raw material and for shaping the same and for bringing about the connections and joints. The same applies to the pressing process and then an already existing stamped part is pressed into shape. However, it is also possible for the first sensor part to be brought into engagement with the second sensor part during a combined stamping-pressing process.

No special requirements exist on the connection or joint between the first sensor part and the second sensor part, so that the first sensor part can also be joined to the second sensor part in a separate operational step.

These and further features can be gathered from the claims, description and drawings and the individual features, both singly and in the form of subcombinations, can be implemented in an embodiment of the invention and in other fields and can represent advantageous, independently protectable constructions for which protection is claimed here. The subdivision of the application into individual sections and the subheadings in no way restrict the general validity of the statements made thereunder.

Figure 1:
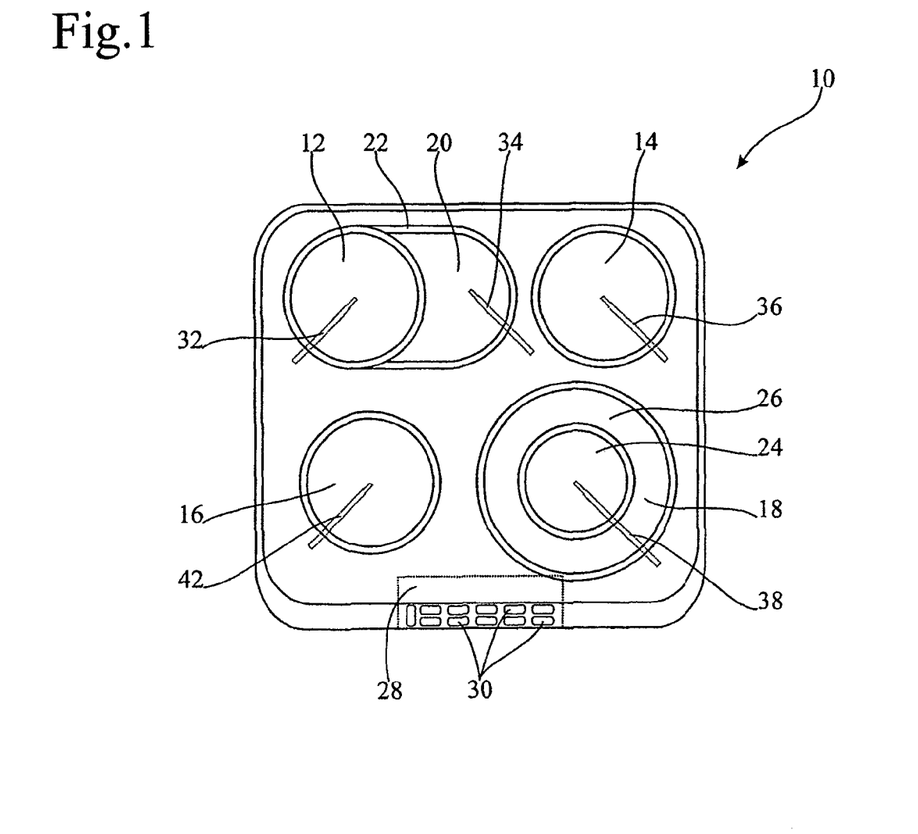
FIG. 1 illustrates a plan view of a cooking appliance with one possible embodiment of inventive the objects therein.

Turning now to the figures, the cooking appliance 10 diagrammatically shown in FIG. 1 has several heating points or hotplates 12, 14, 16, 18, hotplate 12 each having a circular basic shape into which can be switched a hotplate extension 20, so that an oval 22 is formed. The circular hotplate 18 has an inner heating area 24 and an outer heating area 26, where the outer area 26 can be switched into the inner heating area 24. The hotplates 12, 14, 16, 18 can be controlled by means of a control device 28 and the heating capacity to be delivered can be adjusted by means of exemplified switching devices 30.

In the vicinity of hotplates 12, 14, 16, 18 are provided electromechanical temperature detection devices 32, 34, 36, 38, 42, which prevent an overheating of the heating devices of hotplates 12, 14, 16, 18 or of a glass ceramic plate positioned above the same. One of the temperature detection devices 32, 34, 36, 38, 42 is respectively associated with the hotplates 12, 14, 16, 18. The temperature detection devices 32, 34, 36, 38, 42 are electrically connected to control device 28.

Figure 2:
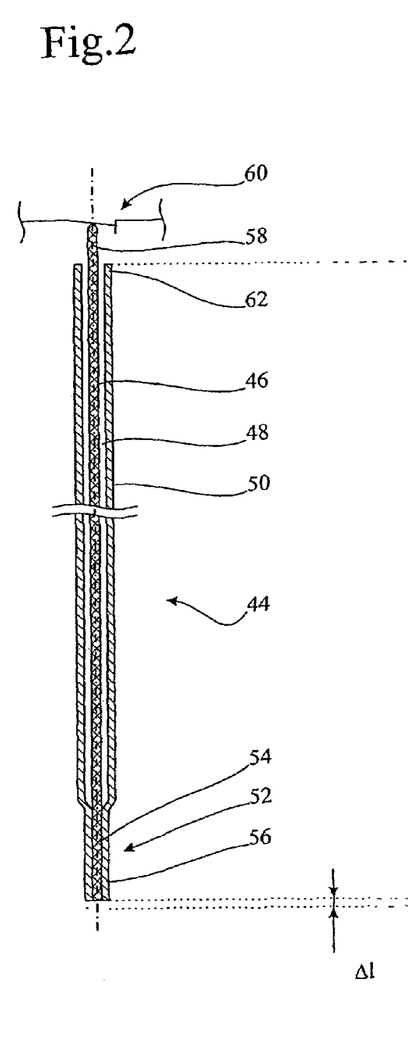
FIG. 2 illustrates a sectional view of one embodiment of an inventive temperature detection device in a state where the temperature is below the switching temperature.
Figure 3:
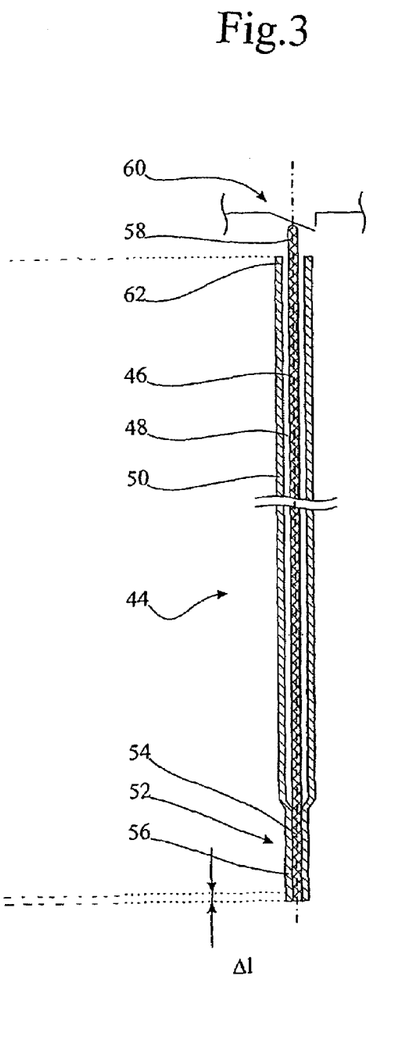
FIG. 3 illustrates a sectional view of one embodiment of an inventive temperature detection device in a state heated at least to the switching temperature.

The electromechanical temperature detection devices 44 have the structure shown in FIGS. 2 and 3. A first, rod-like sensor part 46, preferably made from a ceramic material, is located in an area 48 surrounded by a second sensor part 50. The second sensor part 50 is made from a material, preferably a metal, which has a different and preferably higher temperature expansion coefficient to the first sensor part 46. An end area 54 of the first sensor part 46 and an end area 56 of the second sensor part 50 are engaged with and fixed to one another in an end area 52.

An end area 58 of the first sensor part 46 facing the end area 54 is engaged with a switching device 60. An end area 62 of the second sensor part 50 facing end area 56 is fixed to a not shown base, for example on a not shown housing.

The switching behaviour, in the case of a temperature change and the extension of the second sensor part, which leads to the switching of switching device 6, is known, for example, from the aforementioned U.S. Pat. No. 4,633,238 A1. Specifically, in FIG. 2, the expansion of sensor part 46 causes switch 60 to close, whereas in FIG. 3, the sensor part 46 has not expanded as much and switch 60 has not closed.

The safety switching limit, which here mainly serves to protect a hotplate of a cooking appliance against overheating and the resulting damage or destruction of the hotplate of the cooking appliance, is fixed by the choice of dimensions and materials used.

Figure 4:
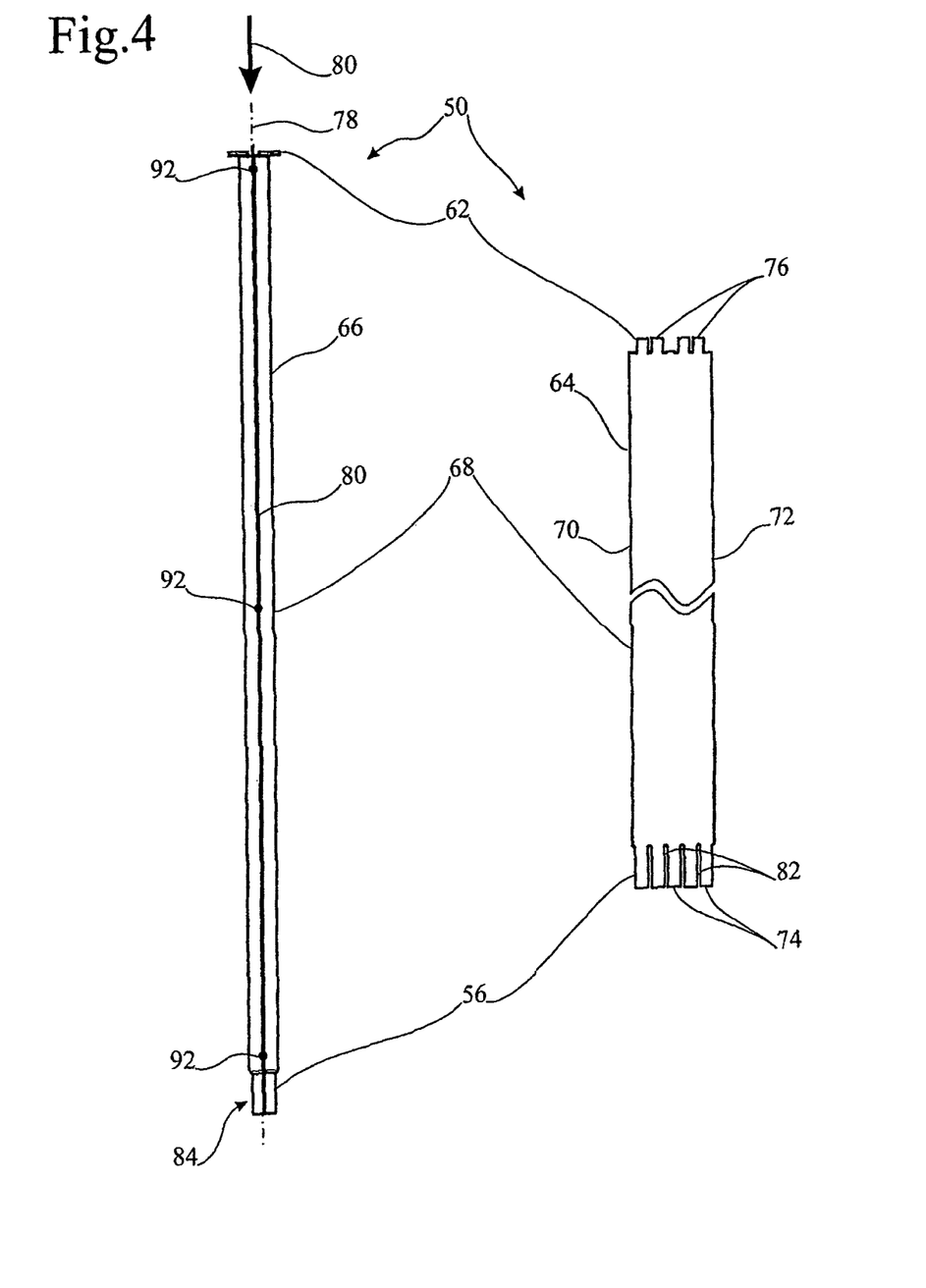
FIG. 4 illustrates a first embodiment of a second sensor part as a blank and in the bent state.

FIG. 4 shows a second sensor part 50 firstly as a blank 64 and secondly as a finished component 66, which is used in an inventive electromechanical temperature detection device. The blank 64 for the second sensor part 50 has resulted from a stamping process, in which the blanks 64 are for example stamped from a sheet or a strip material. In place of the stamping process any other process can be used in which an object is separated in shaping manner from a raw material, such as for example laser cutting, sawing, milling or eroding.

The second sensor part 50 has a first end area 56, a second end area 62 and a central area 68. In the central area 68 the second sensor part 50 has a first longitudinal edge 70 and a second longitudinal edge 72, which are essentially straight. In addition, in the end area 56 of the second sensor part 50 there are several elongated strips 74 forming comb-like gaps in blank 64 and in end area 62 there are several strips arranged in comb-like manner in blank 64.

In order to produce from blank 64 the second sensor component 66, blank 64 is so bent round a median longitudinal axis 78 that the longitudinal edges 70, 72 contact in a joint or seam area 80 and the second sensor part 50 enclosed a volume. This can take place in a number of steps. Although bent, second sensor component 66 retains its shape in the bent state, in the joint area 80 the longitudinal edges 70, 72 are advantageously fixed, for example by welding spots 92.

The strips 76 in end area 62, during the bending process where the blank 64 is brought into the form of component 66, are so bent that they project vertically from the median longitudinal axis 78. When considered from arrow direction 80 they have a star-like arrangement, so that they can be used for anchoring purposes in a housing.

During the bending process or a further working step, the end area 56 of the second sensor part 50 is tapered, so that the gaps 82 between strips 74 are closed. By means of the taper 84, the here not shown, first sensor part is aligned with and fixed to the second sensor part 50.

Figure 5:
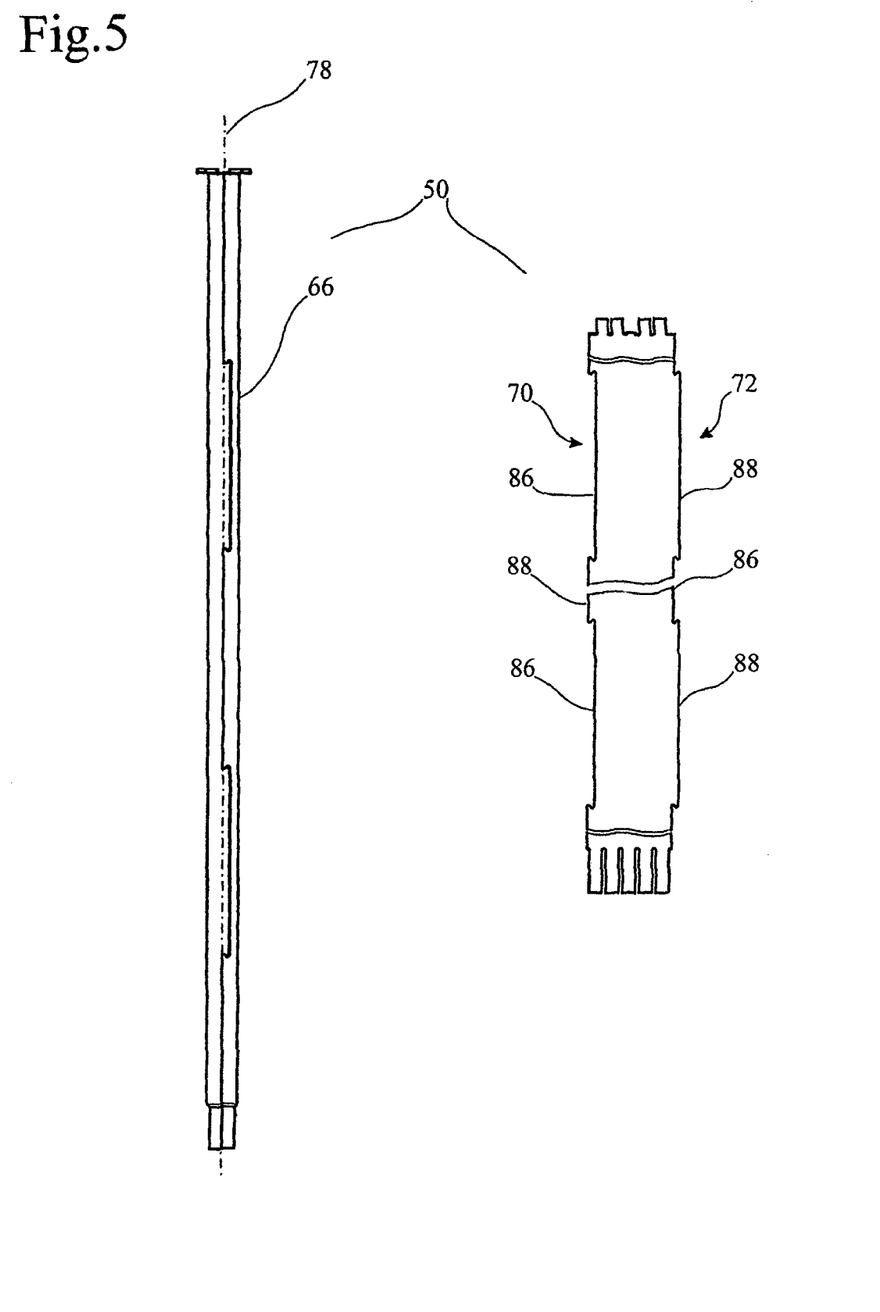
FIG. 5 illustrates a second embodiment of a second sensor part as a blank and in the bent state.

The sensor part 50 shown as a blank 64 or sensor component 66 in FIG. 5 differs from that shown in FIG. 4 in that the longitudinal edges 70, 72 have recesses 86 and projections 88 respectively, the recesses 86 having a corresponding shape to the projections 88. In the example according to FIG. 5, the recesses 86 and projections 88 have rounded, undercut shapes. However, the recesses can also have other shapes, for example trapezoidal or wavy.

During the process of bending round the median longitudinal axis 78 for producing sensor component 66, the recesses 86 are brought into engagement with the projections 88 and in this way bring about a positive engagement. A further securing of the bent shape, for example by welding, is unnecessary when using recesses 86 and projections 88 respectively, but can also be provided.

Figure 6:
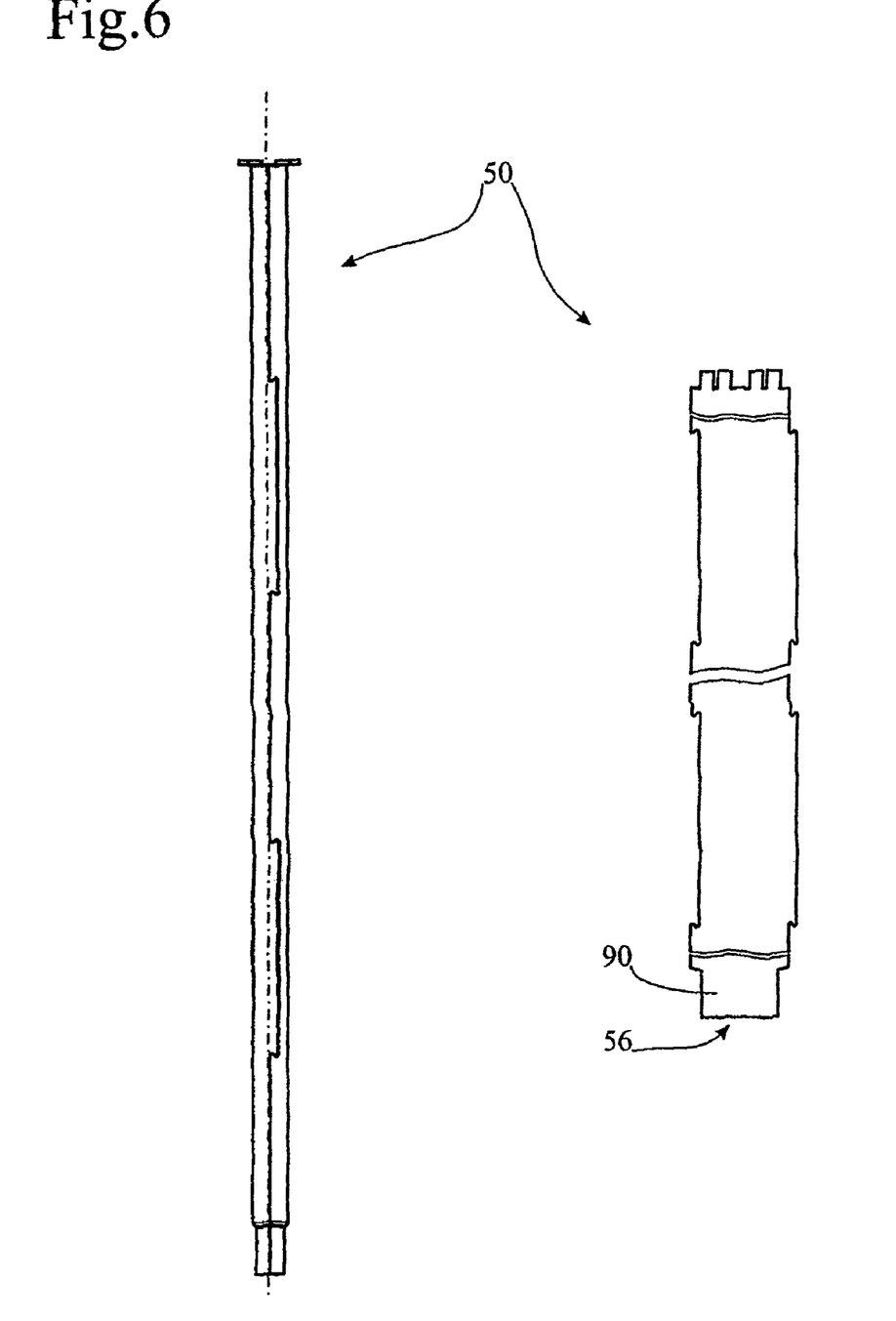
FIG. 6 illustrates a third embodiment of a second sensor part as a blank and in the bent state.

Unlike the second sensor parts 50 shown in FIGS. 4 and 5, the end area 56 of the second sensor part 50 in FIG. 6 has no strips forming comb-like gaps and instead only has a plate-like portion 90. However, said portion, like the previously described strips, during the process of bending round the median longitudinal axis 78, is constructed for the fixing and aligning of the first sensor part.

Figure 7:
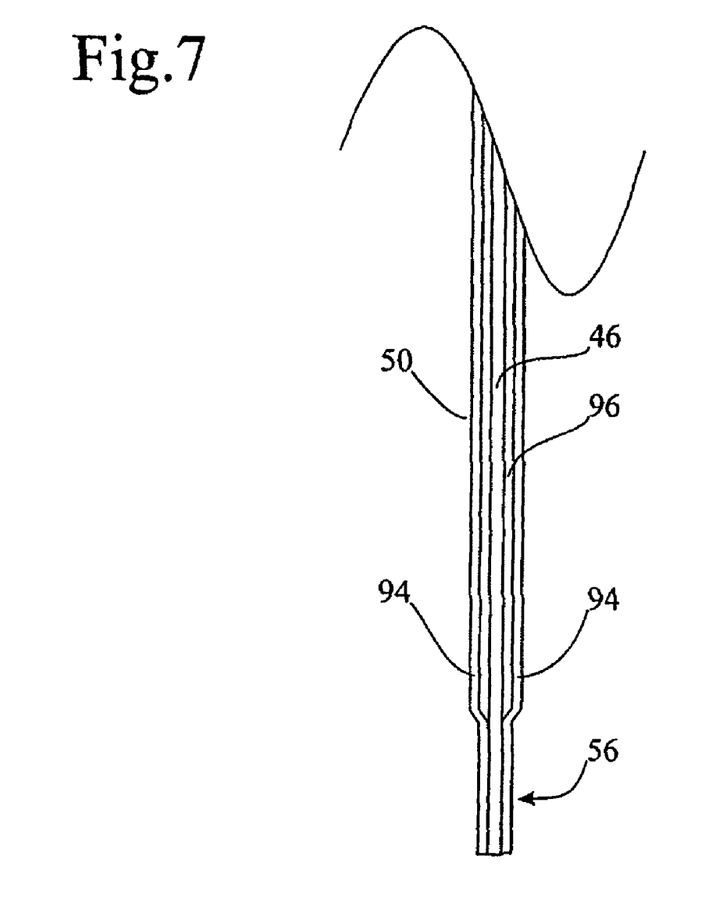
FIG. 7 illustrates a plan view of a fourth embodiment of a second sensor part and a view from the front, FIG. 8 illustrate a front view of a second sensor part according to FIG. 7.

FIG. 7 shows another embodiment of the second sensor part 50, which has three, preferably stamped rods 94, which are arranged in star-like manner round the first sensor part 46 so as to form gaps 96. The first sensor part 46 is fixed by the rods 94 in end area 56. The first sensor part 46 is for example fixed by clips, bonding or any other possible fixing mode.

Figure 8:
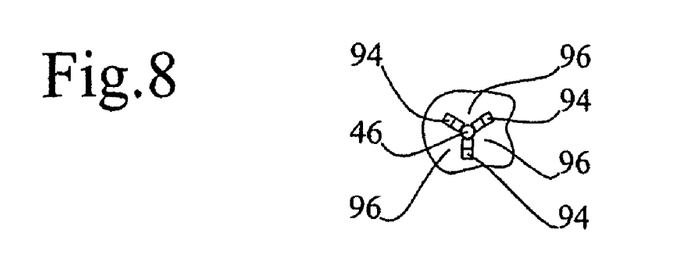

FIG. 8 illustrates the star-like structure of sensor parts 46, 50 in a diagrammatic front view of the embodiment shown in FIG. 7. In place of the three rods 94, which then surround the first sensor part 46 so as to form three gaps 96, any random number of rods 94 can be provided.

Figure 9:
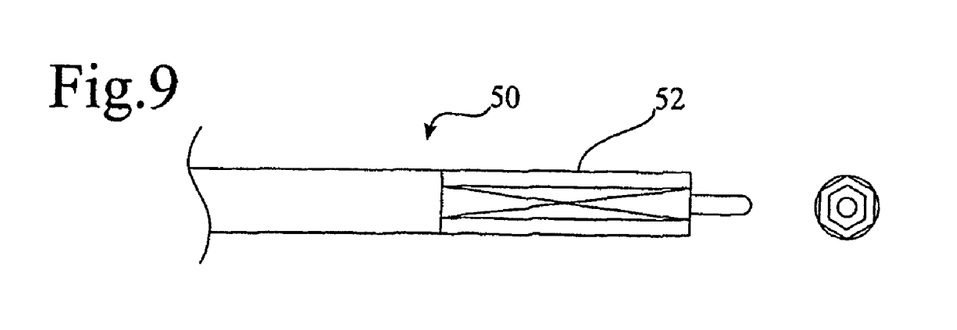
FIG. 9 illustrates a detail view of an end area of the second sensor part in a first embodiment.
Figure 10:
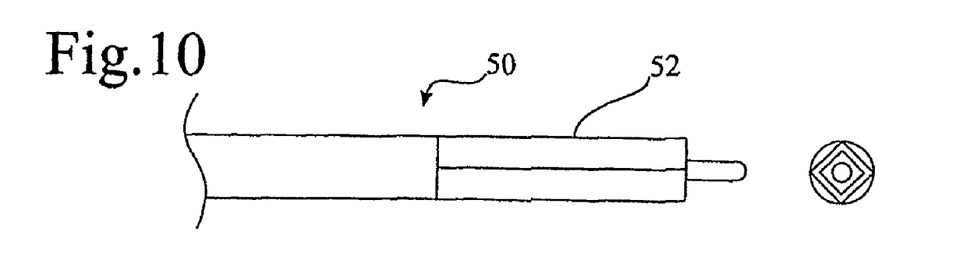
FIG. 10 illustrates a detail view of an end area of the second sensor part in a second embodiment.
Figure 11:
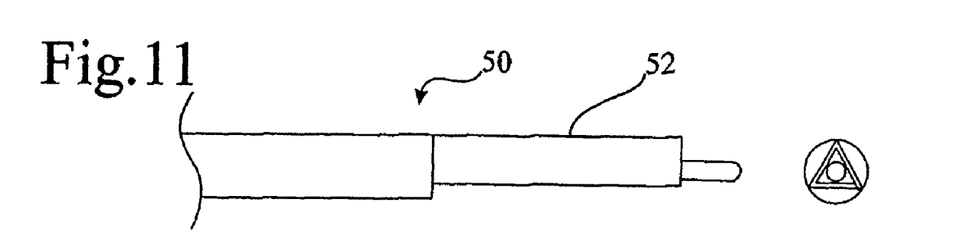
FIG. 11 illustrates a detail view of an end area of the second sensor part in a third embodiment.

In place of the star-like configuration of the end area 52 for fixing the second sensor part 50 to the base described relative to FIG. 4, the end area 52 can also have further shapes, such as are for example shown in FIGS. 9, 10 and 11. Thus, end area 52 in FIG. 9 has a hexagonal cross-section, end area 52 in FIG. 10 a quadrangular cross-section and the end area in FIG. 11 a triangular cross-section, but other prismatic shapes are possible. The shaping possibilities for the end area 52 are chosen in such a way as to provide a twist protection for the second sensor part 50 on the base. The shapes can be pressed, ground or produced using some other shaping procedure.

The invention claimed is:

1. An electromechanical temperature detection device for a cooking appliance, said device having at least one first, elongated sensor part and at least one second tubular-like sensor part, said first sensor part within said second sensor part and being at least partly parallel to a longitudinal axis of said second sensor part, said first sensor part and said second sensor part being made from materials with different thermal expansion coefficients, wherein an end area of said first sensor part and an end area of said second sensor part are connected with each other, wherein an opposite end area of said first sensor part or said second sensor part is connected to a switching device, wherein said second sensor part comprises a stamped part comprising a first longitudinal edge and a second longitudinal edge, which along a longitudinal axis is shaped so that said second sensor part at least partly surrounds an elongated area with said first sensor part therein such that said first longitudinal edge is in contact with said second longitudinal edge, wherein on said first longitudinal edge of said stamped part is provided at least one portion projecting from said first longitudinal edge and wherein on said second longitudinal edge of said stamped part facing said first longitudinal edge is provided at least one recess corresponding to said projecting portion.

2. The electromechanical temperature detection device according to claim 1, wherein said second sensor part is at least partly roughly concentrically bent around a median longitudinal axis and said second sensor part is constructed at least partly with a circular cylindrical, elliptical or lenticular cross-section.

3. The electromechanical temperature detection device according to claim 1, wherein said second sensor part has an at least partly cylindrical construction.

4. The electromechanical temperature detection device according to claim 1, wherein said second sensor part has an at least partly prismatic cross-section.

5. The electromechanical temperature detection device according to claim 1, wherein on each longitudinal edge is provided both at least one projecting portion and also at least one recess corresponding to a projecting portion.

6. The electromechanical temperature detection device according to claim 1, said at least one projecting portion is engaged with its corresponding recess, so as to provide a positive engagement.

7. The electromechanical temperature detection device according to claim 1, wherein said first longitudinal edge and said second longitudinal edge of said second sensor part are integrally joined to one another.

8. The electromechanical temperature detection device according to claim 1, wherein said stamped part is made of a flat material comprising sheet metal.

9. An electromechanical temperature detection device for a cooking appliance, comprising:
- a first, elongated sensor part having a first longitudinal axis comprising a first material with a first thermal expansion coefficient; and
- a second tubular-like sensor part comprising a second material with a second thermal expansion coefficient comprising a stamped sheet metal part having a first longitudinal edge and a second longitudinal edge to form a tubular shape having a second longitudinal axis, wherein said first longitudinal edge of said second tubular sensor part interlocks with said second longitudinal edge,
  wherein said first elongated sensor part is positioned within said tubular shape of said second sensor part so that said first longitudinal edge aligns and is in contact with said second longitudinal edge and said first elongated sensor part is at least partly surrounded by said second sensor part,
- wherein a first end of said first sensor is affixed to a first end of said second tubular-like sensor part and a remaining portion of said first sensor part is allowed to move relative to the second sensor part along the first longitudinal axis during expansion of said first sensor part, and
- wherein a second end of said second sensor part is affixed to a switching device such that said first sensor part, upon expansion, is configured to cause said switching device to interrupt a circuit at a preset temperature.

* * * * *